United States Patent [19]

Swyt et al.

[11] 4,152,074
[45] May 1, 1979

[54] INVERSE FOURTH POWER PHOTOMETRIC CALIBRATOR

[75] Inventors: Dennis A. Swyt; Russell D. Young, both of Gaithersburg, Md.

[73] Assignee: The United States of America as represented by the Secretary of Commerce, Washington, D.C.

[21] Appl. No.: 868,356

[22] Filed: Jan. 10, 1978

[51] Int. Cl.$^2$ .................... G01J 1/00; G02B 5/14
[52] U.S. Cl. .................... 356/213; 356/243; 250/252; 250/227
[58] Field of Search .............. 356/213, 218, 225, 226, 356/229, 230, 232, 243; 250/252, 227

[56] References Cited

U.S. PATENT DOCUMENTS

| | | | |
|---|---|---|---|
| 736,064 | 8/1903 | Burnett | 356/232 |
| 3,344,703 | 10/1967 | Milton | 356/218 |

Primary Examiner—Rolf G. Hille
Attorney, Agent, or Firm—Eugene J. Pawlikowski; Alvin J. Englert

[57] ABSTRACT

A photometric calibrator is disclosed wherein a known and continuously variable amount of light flux received at a detector is linearly proportional to the inverse fourth power of the optical path length between the detector and a primary, quasi-point source of the light flux. The calibrator includes a secondary, quasi-point light flux source wherein the total flux emitted thereby is proportional to the flux received thereby over a quasi-point detecting area located at some distance, d, from the primary source. The detector is located at an equal distance d from the secondary source.

10 Claims, 6 Drawing Figures

INVERSE FOURTH POWER PHOTOMETRIC CALIBRATOR

FIELD OF THE INVENTION

The present invention relates generally to photometers, and more particularly to an inverse fourth power photometric calibrator.

DESCRIPTION OF THE PRIOR ART

There are photometric devices known in the prior art which are based on the well-known physical phenomenon of the inverse square attenuation of a spherical wave. An example of such a device is disclosed in U.S. Pat. No. 736,064 (Burnett). The principal disadvantage of an inverse square apparatus is that an attenuation of only about 1.25 orders of magnitude is the maximum which is practically attainable. The problem with conventional inverse square devices is that the light path lengths required for higher degrees of attenuation are prohibitively long. For example, in order to obtain attenuation of six orders of magnitude, a path approximately one-half mile long would be required. At such distances, though, atmospheric systems introduce too much secondary attenuation, resulting from particulate scattering and inhomogeneities in the air, to be of any practical utility; and vacuum systems are impractical.

SUMMARY OF THE INVENTION

In accordance with the present invention, a photometric calibrator comprises first and second quasi-point light sources and a detector. The second light source, which defines a first quasi-point detecting area spaced from a first effective emission point defined for the first light source by a distance d, emits light flux such that the total light flux emitted is proportional to the light flux received from the first light source over the first detecting area. The detector defines a second quasi-point detecting area spaced from a second emission point defined for the second light source by the same distance d, and detects the light flux received from the second light source over the second detecting area.

In accordance with one aspect of the invention, the second light source may comprise a photodetector having a collecting aperture which defines the first detecting area, a variable light flux output light source, and a control for proportionally varying the intensity of the variable light source in dependence on the output of the photodetector.

In accordance with another aspect of the invention, the second light source comprises a light flux collector which defines the first detecting area, and a mixer-emitter which mixes/diffuses the light flux collected by the collector and emits the mixed light flux as a quasi-point source. In accordance with various aspects of the invention, the light flux collector may comprise an aperture-defining element and the mixer-emitter may comprise a condenser lens, or a ground glass element and a further aperture-defining element. Alternatively, a bundle of incoherently arranged optical fibers may constitute the light flux collector and mixer-emitter.

In accordance with yet another aspect of the invention, the first emission point and second detecting area lie in a first plane, and the first detecting area and second emission point lie in a second plane so as to form a folded light path between the first emission point and the second detecting area. Additionally, the second plane may be displaceable with respect to the first plane along an axis which is parallel to an optical axis between the first and second light sources.

As a consequence of the present invention, a photometric device is provided wherein a known and continuously variable amount of light flux is received at a detector which is linearly proportional to the inverse fourth power of the length of the optical path between a source of the flux and the detector. Although the inverse fourth power attenuation phenomenon has heretofore been observed in the fields of radar and telecommunications with respect to the power of a signal which has been returned from a target, this phenomenon has not been employed in any prior art photometric device of which applicants are aware.

Other features and advantages of the invention will be set forth in, or apparent form, the detailed description of the preferred embodiments found hereinbelow.

DETAILED DESCRIPTION OF THE PREFERRED EMBODIMENTS

Figure 1:
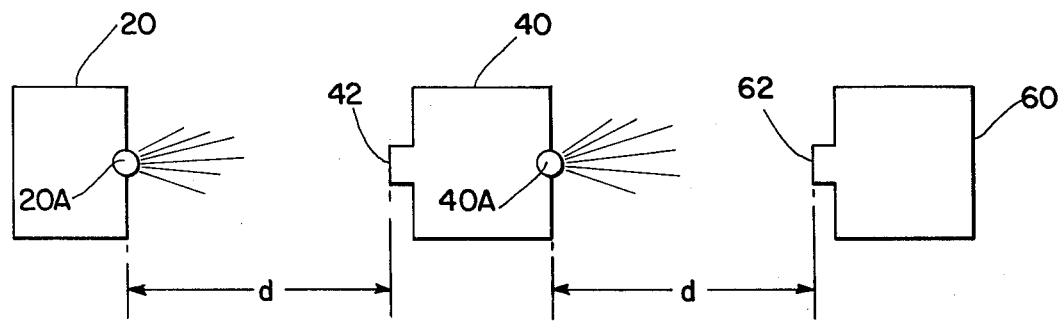
FIG. 1 is a highly schematic block diagram of the basic components of a photometric calibrator constructed in accordance with the present invention.

Referring to the schematic block diagram of FIG. 1, the basic components of a photometric calibrator constructed in accordance with the present invention will be described. The calibrator includes a first light source 20 for emitting light as a quasi-point source, and a second light source, generally denoted 40, for emitting light as a quasi-point source and such that the total light flux emitted thereby is directly proportional to the light flux received from light source 20 over a first quasi-point detecting area 42, such as is provided by a collecting aperture, some illustrative forms of which are described in more detail hereinbelow, which is coaxially disposed at some distance, d, from a first point of emission 20A which is defined for light source 20. A light flux detector 60 is also provided for detecting the light flux received from light source 40 over a second quasi-point detecting area 62 coaxially disposed with respect to a second point of emission 40A defined for source 40 at a distance which is equal to the distance d referred to hereinabove. As a consequence, the amount of light flux detected by detector 60 is inversely proportional to the fourth power of the distance d.

For calibration measurements, collecting areas 42 and 62 should be effectively normal to the incident flux. Thus, collecting areas 42 and 62 preferably define plane surfaces and are small relative to the distance d and the sizes of the points of emission 20A and 40A from light sources 20 and 40, respectively. Based on American National Standard Institute (ANSI) Standard No. PH2.19-1976, "Conditions for Diffuse and Doubly Diffuse Transmission Measurements (Transmission Density)", distance d should preferably be a minimum of twenty times the maximum linear dimension of the points of emission of light sources 20 and 40 or of collecting areas 42 and 62, whichever is largest. Generally speaking, it is to be noted that the flux received at a detector having a detecting area of radius b from a coaxial Lambertian source (perfect diffuser) having an emitting point of radius a, and which is separated from the detector by a distance d, is proportional to:

$$[(b^2+d^2+a^2)-\sqrt{(b^2+d^2+a^2)^2-4a^2b^2}]/\, 2a^2$$

Thus, distance d should be enough greater than radii a and b that the formula above is effectively equivalent to $1/d^2$.

Figure 2:
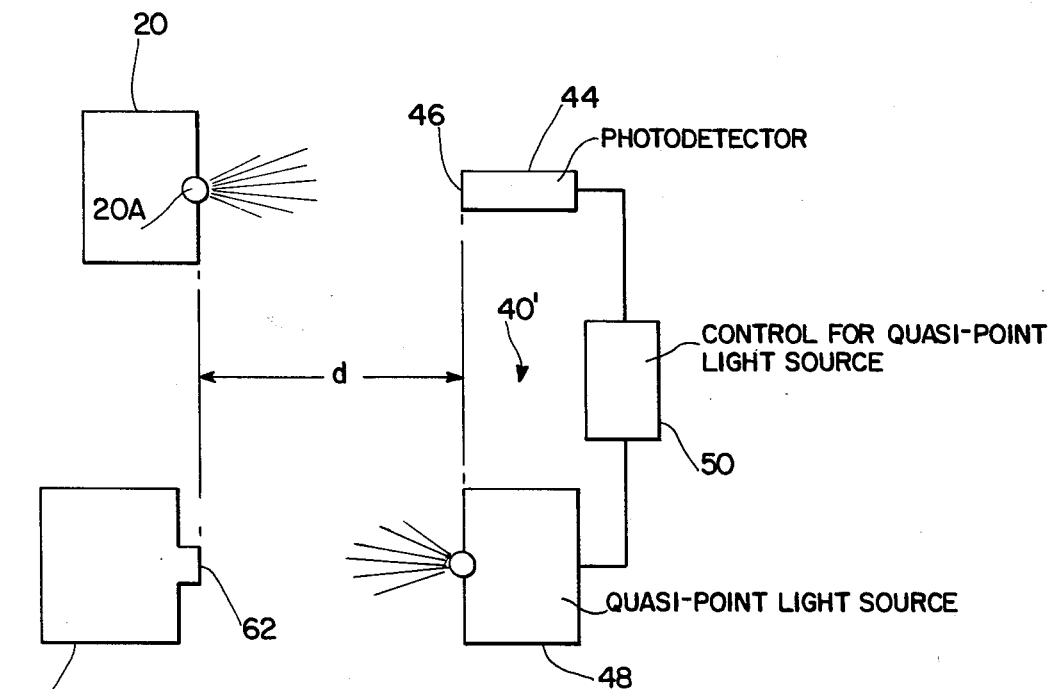
FIG. 2 is a schematic block diagram of a first embodiment of component 40 of the calibrator illustrated in FIG. 1.

A number of preferred embodiments of light source 40 will now be described. Referring to FIG. 2, a first embodiment, generally denoted 40′, comprises a conventional photodetector 44 having a collecting aperture 46, which defines collecting area 42, for detecting light flux from light source 20; a conventional variable quasi-point light source 48; and conventional control means 50 for proportionally varying the light flux output of source 48 in dependence on the outut of photodetector 44.

Figure 3:
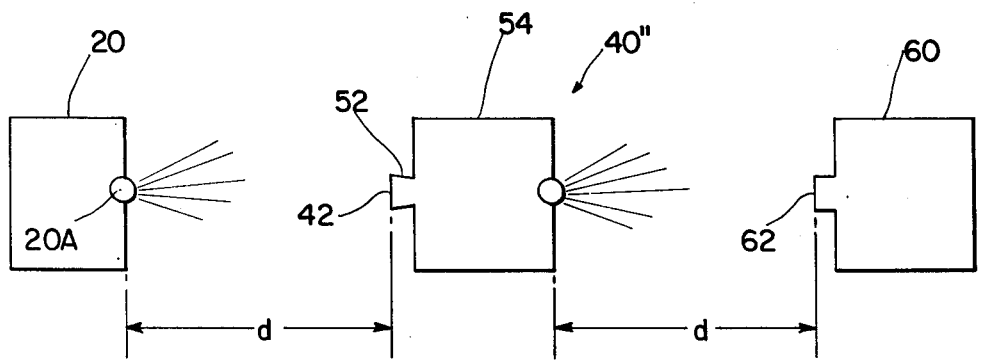
FIG. 3 is a schematic block diagram of a second embodiment of component 40 of the calibrator illustrated in FIG. 1.

It is noted that it is not essential that a separate independent light source be used for light source 40, as shown in the embodiment of FIG. 1. Thus, an alternative approach, utilizing the light flux received from light source 20, is schematically illustrated in FIG. 3, wherein light source 40″ comprises a collector 52, defining detecting area 42, for collecting the flux received from light source 20; and a mixer-emitter 54 for diffusing, or mixing, the collected light flux, and for emitting the mixed flux as a quasi-point source. Collector 52 and mixer-emitter 54, which are shown schematically in FIG. 3, can take a number of different forms as discussed hereinbelow.

Figure 4:
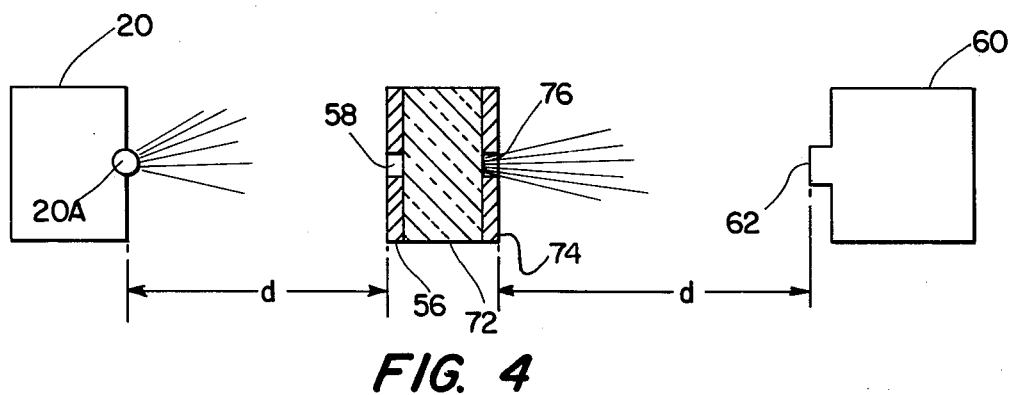
FIGS. 4–5 are cross-sectional views of specific forms of the embodiment of component 40 illustrated in FIG. 3.
Figure 5:
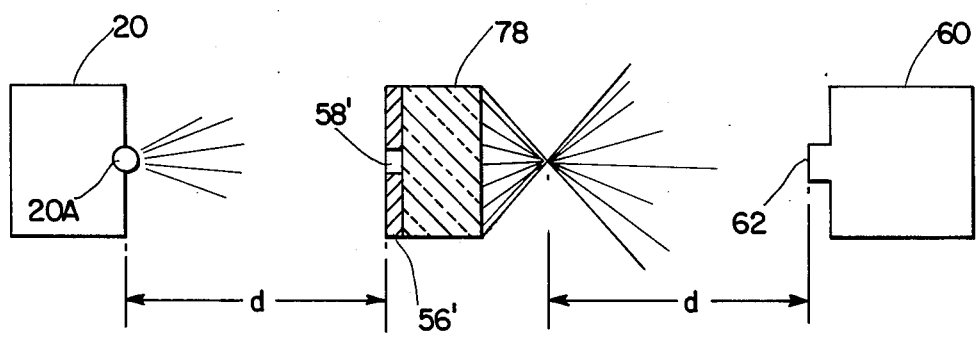
Figure 6:
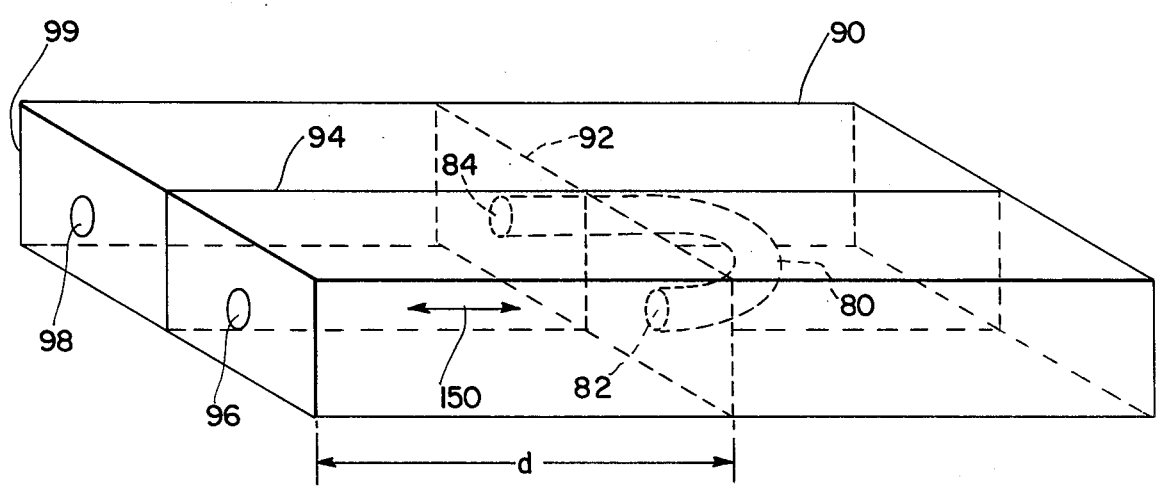
FIG. 6 is a perspective view of another embodiment of the calibrator illustrated in FIG. 1.

Several embodiments of collector 52 and mixer-emitter 54 are illustrated in FIGS. 4–6. Referring to FIG. 4, a collector corresponding to collector 52 is provided which comprises a plate 56 defining a collecting aperture 58; and a mixer-emitter corresponding to mixer-emitter 54 is provided which comprises a ground glass element 72 for mixing the light flux collected by aperture 58, and a second plate 74 defining a quasi-point aperture 76 through which the light flux mixed by element 72 is emitted.

In the embodiment illustrated in FIG. 5, a mixer-emitter is provided which comprises a condenser lens 78 which focuses the collected flux passing therethrough to a quasi-point and thus effectively mixes the collected flux and emits as a quasi-point light source.

In the embodiment of FIG. 6, a mixer-emitter comprises a bundle 80 of light transmitting optical fibers which have been incoherently arranged, e.g., the fibers have been twisted with respect to each other such that the respective ends of each fiber do not occupy the same relative position in bundle 80 with respect to the other fiber ends. The size and packing of fiber bundle 80 is such that bundle end 82 constitutes a flux collector corresponding to collector 52 of FIG. 3, and bundle end 84 constitutes a quasi-point light source from which the mixed light flux is emitted.

The mixer-emitter 54 of FIG. 3 can advantageously be constructed such that collecting area 62 and emission point 20A are in the same plane, and collecting area 42 and emission point 40A are in the same plane, thereby providing a folded optical path between source 20 and detector 60. In the embodiment of FIG. 6, a light source and a detector, corresponding to light source 20 and detector 60 of FIG. 1, but not shown, are mounted at one end of a housing 90 and emission point 20A and detecting area 62 therefor are defined by apertures 96 and 98, respectively, in the end wall 99 of housing 90, while fiber bundle 80 is mounted on a carriage 92 such that bundle ends 82 and 84 face end wall 99 and are disposed in spaced-apart, coplanar relationship in coaxial alignment with apertures 96 and 98, respectively.

Still referring to FIG. 6, carriage 92 may be slidably mounted, as denoted by double-headed arrow 150, in a conventional manner (not shown) within housing 90 such that carriage 92 may be displaced along an axis parallel to the folded optical path between source 20 and detector 60, thereby allowing the degree of attenuation to be varied. Further, optical interference may be eliminated by providing housing 90 with a dividing partition 94, as shown, such that separate, optically isolated and enclosed paths are provided within housing 90 between source 20 and source 40, and between source 40 and detector 60.

With a device constructed in accordance with the present invention, such as the embodiment illustrated in FIG. 6, a self-calibrating inverse fourth power photometric detector is provided which can measure directly the transmission factor of optical materials, the response characteristics of photodetectors, and the output characteristics of light sources. Moreover, in contrast to conventional inverse square photometric devices, direct measurements of nearly six orders of magnitude of attenuation have been achieved with a device similar to that illustrated in FIG. 6.

Although the invention has been described with respect to exemplary embodiments thereof, it will be understood that variations and modifications can be effected in the embodiments without departing from the scope or spirit of the invention.

We claim:

1. An inverse fourth power photometric calibrator comprising first means for emitting light flux as a quasi-point source from a first effective emission point; second means, defining a first quasi-point detecting area spaced from said first emission point by a distance d, for emitting light flux as a quasi-point source from a second effective emission point and such that the total light flux emitted is proportional to the light flux received from said first light emitting means over said first detecting area; and means, defining a second quasi-point detecting area spaced from said second emission point by said distance d, for detecting the light flux received from said second light emitting means over said second detecting area.

2. The calibrator of claim 1 wherein said second light emitting means comprises photodetector means having a collecting aperture defining said first detecting area, a variable light flux output light source, and means for proportionally varying the output of said variable output light source in dependence on the output of said photodetector means.

3. The calibrator of claim 1 wherein said second light emitting means comprises means defining said first detecting area for collecting said light flux received from said first light emitting means, and means for mixing/diffusing the light flux collected by said collecting means and for emitting mixed light flux as a quasi-point source.

4. The calibrator of claim 3 wherein said mixing and emitting means comprises a plurality of incoherently-arranged optical fibers bundled together such that the respective ends thereof collectively constitute at a first end said flux collecting means and at a second end a quasi-point source from which said mixed flux is emitted.

5. The calibrator of claim 3 wherein said flux collecting means comprises means defining a collecting aperture, and said mixing and emitting means comprises a condenser lens.

6. The calibrator of claim 3 wherein said flux collecting means comprises means defining a collecting aperture, and said mixing and emitting means comprises at least one ground glass element and means defining an emitting aperture.

7. The calibrator of claim 4 wherein said first and second ends of said bundled fibers lie in a first plane, and said second detecting area and said first emission point lie in a second plane, and said second light emitting means is displaceable with respect to said second plane along an axis parallel to an optical axis between said first and second light emitting means.

8. The calibrator of claim 7 wherein the optical paths between said first and second emitting means and between said second light emitting means and said second detecting surface are optically isolated from each other and from the environment.

9. The calibrator of claim 1 wherein said first emission point and said second detecting area are disposed in a first plane, and said second emission point and said first detecting area are disposed in a second plane so as to form a folded optical path between said first emission point and said second detecting area.

10. The calibrator of claim 1 wherein said first and second planes are displaceable with respect to each other along an axis parallel to said folded optical path, thereby allowing the degree of attenuation of the light flux detected by said detecting means to be varied.

* * * * *